June 19, 1951 A. C. D'ARCEY 2,557,784
REMOTE CONTROL
Filed March 28, 1946 4 Sheets-Sheet 1

INVENTOR.
Alfred C. D'Arcey
BY
Martin J. Finnegan
Attorney

June 19, 1951 A. C. D'ARCEY 2,557,784
REMOTE CONTROL
Filed March 28, 1946 4 Sheets-Sheet 2

INVENTOR.
Alfred C. D'Arcey
BY
Martin J. Finnegan
attorney

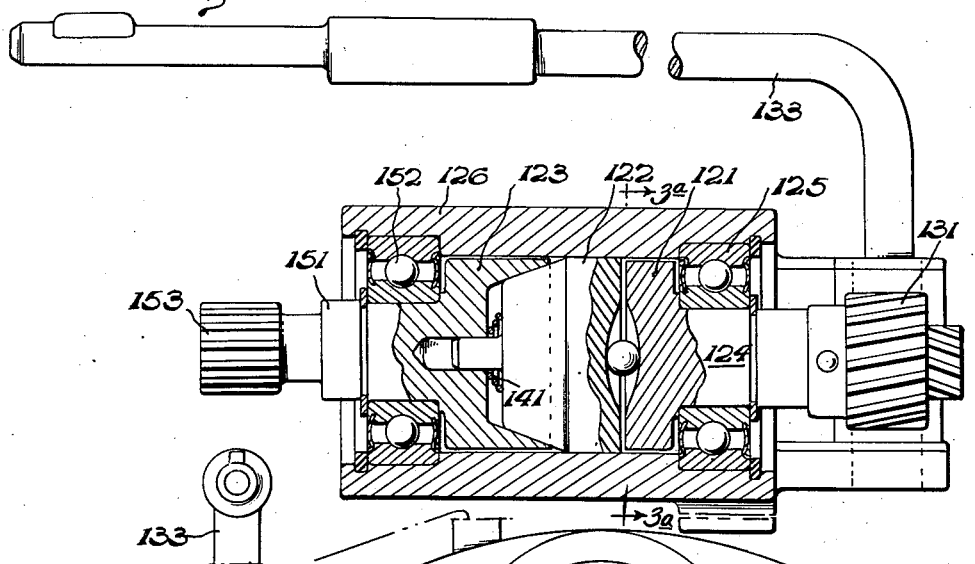
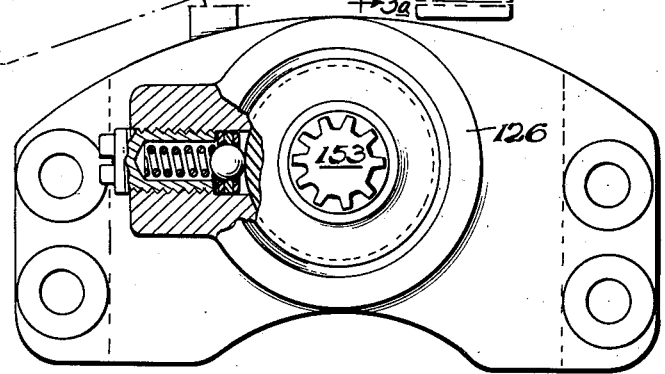
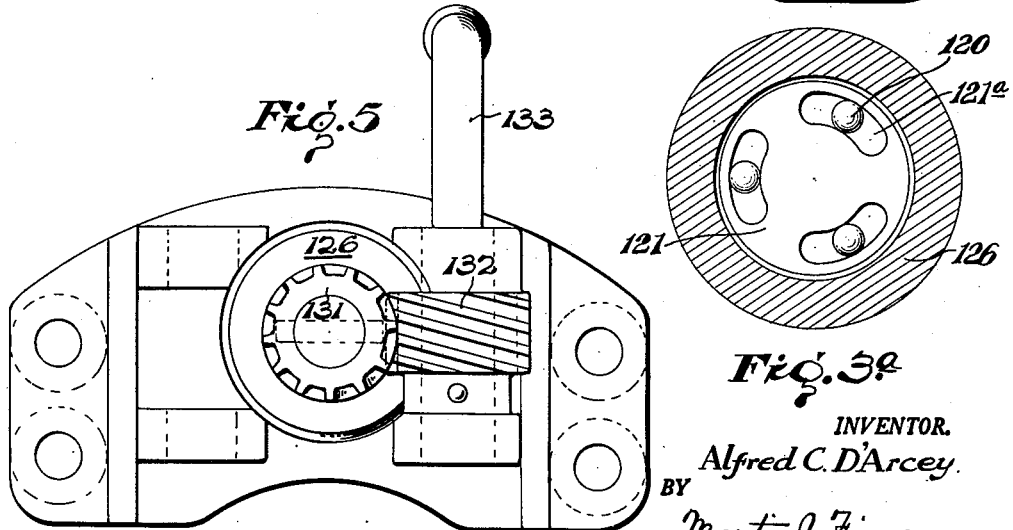

June 19, 1951  A. C. D'ARCEY  2,557,784
REMOTE CONTROL
Filed March 28, 1946  4 Sheets-Sheet 4
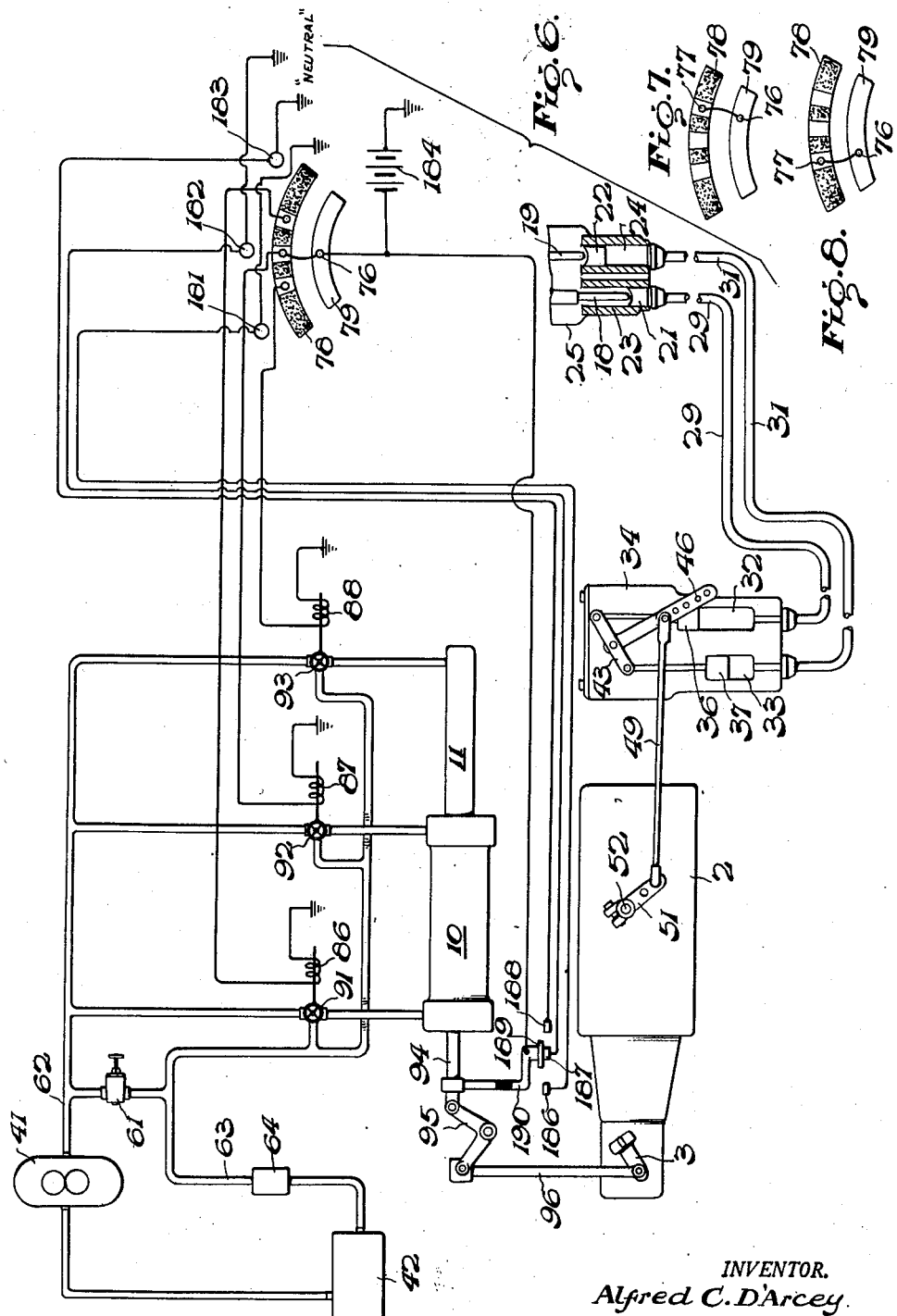
INVENTOR.
Alfred C. D'Arcey
BY
Martin J. Finnegan
attorney Patented June 19, 1951

2,557,784

UNITED STATES PATENT OFFICE 2,557,784

REMOTE CONTROL

Alfred C. D'Arcey, Norwood, Mass., assignor to Bendix Aviation Corporation, Norwood, Mass., a corporation of Delaware Application March 28, 1946, Serial No. 657,685

2 Claims. (Cl. 74—479)

This invention relates to remote controls, and particularly to the control of the operation of a plurality of devices from a single station, and by a single actuating mechanism.

An object of the invention is to combine in a single control member novel means for operating a plurality of separate units, thus eliminating the need for an attendant to move his hand from one actuator to another when a second functional unit requires actuation.

Another object is to simplify the construction of the controlling mechanism for the actuation of a plurality of remotely situated units to be actuated—as, for example, the throttle of a power plant prime mover, the reverse gear for connecting said prime mover to its load (e. g. ship's propeller), and a signal device or devices for indicating various conditions relating thereto.

Another object is to provide an actuator member manually rotatable about a central axis, and mechanism associated therewith for converting successive stages of rotation into successive functional results—as, for example, the successive shifting of the reverse gear and throttle of a marine power plant.

Another object is to provide, in conjunction with such an actuator, an auxiliary device rotatable about a second axis, for producing a more sensitive, or verniered, movement of the main actuator about said first-named central axis, thus making possible a more precise shifting of a part to be actuated, such as the throttle of an engine whose speed is to be synchronized with that of a twin engine, or whose speed is to be held within fine limits.

In installations including such a verniering mechanism between the actuator and a part to be actuated, a further object is to provide a novel and simplified structure and mode of operation of said verniering mechanism. In this connection a feature of the invention is the use of a clutch mechanism involving two co-operating clutch units which transmit a positive drive, in either rotational direction, but only in one torque transmitting direction; the mechanism permitting coasting in the reverse torque direction and thus allowing freedom of movement of the main actuator member, while at the same time avoiding the danger of setting up a phase displacement at either end of the system.

Other objects and features of the invention will appear in the following description of one application thereof, the described application being illustrated in the accompanying drawings and defined in the appended claims; which claims, however, include such other applications and embodiments as may be embraced by the broadest interpretation of language employed therein.

In said drawings:

Figure 3 is a sub-assembly view, with the verniering unit shown in longitudinal section;

Figure 3a is a view in cross section taken on the line 3a—3a of Figure 3;

Figures 4 and 5 are opposite end views of the verniering unit;

Figure 6 is a schematic diagram of the entire system; the circuit controller brushes being shown in neutral position;

Figure 7 shows the circuit controller brushes as in the "ahead" position; and

Figure 8 shows the circuit controller brushes in the "reverse" position.

Figure 1:
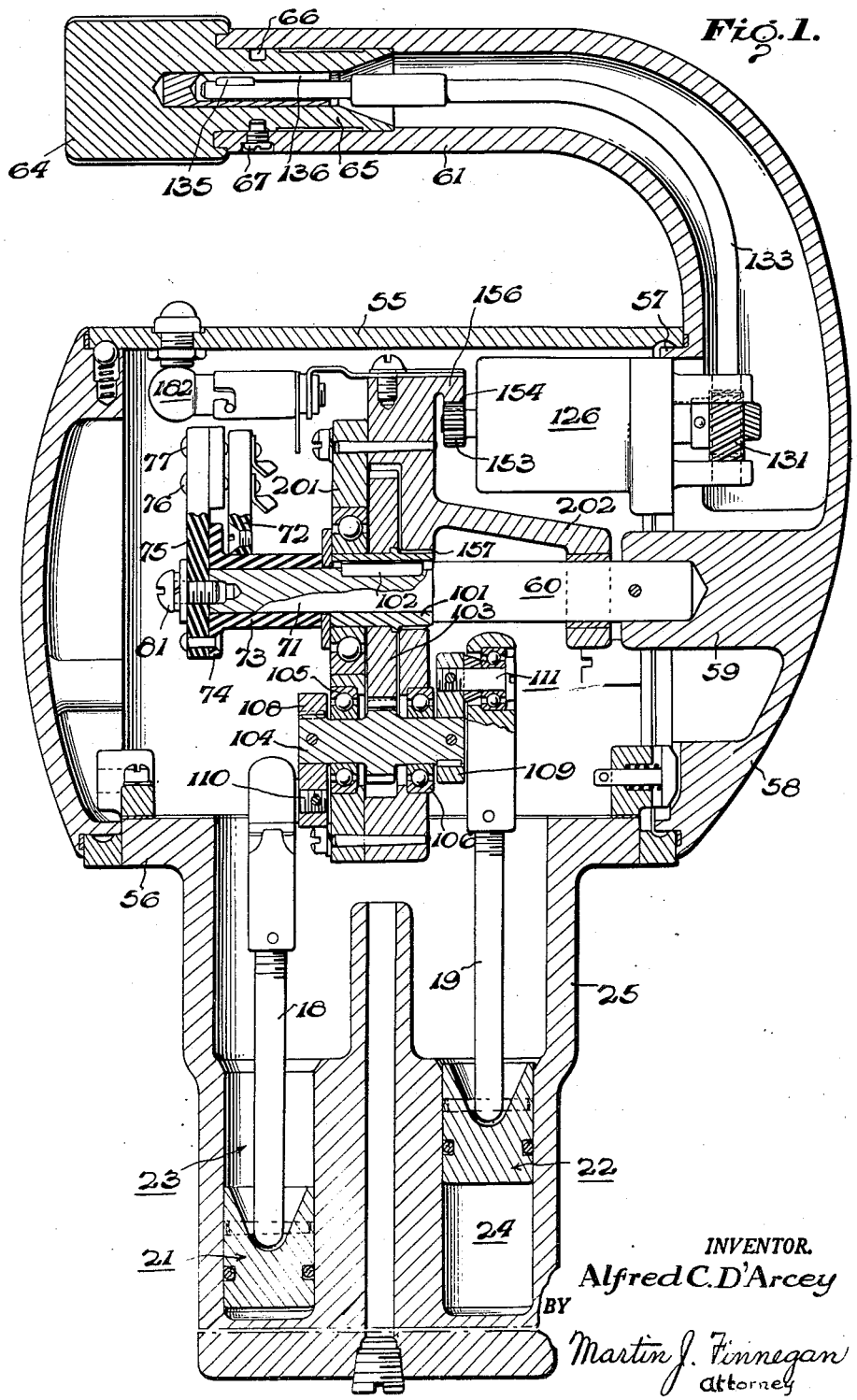
Figure 1 is a sectional side view of the actuator, including the hydraulic transmitter.

Reference character 2 (Figure 6) designates a schematic representation of a power plant having a carburetor throttle lever at 51, a reverse gear operating lever at 3, hydraulic cylinders 10 and 11 (corresponding to cylinders 10 and 11 of my co-pending application No. 644,287 filed January 30, 1946, now Patent No. 2,551,246, dated May 1, 1951) for operation of said reverse gear lever 3, and hydraulic units 25 and 34 (corresponding to units 25 and 34 of my co-pending application No. 632,681 filed December 4, 1945, now Patent No. 2,468,489, dated April 26, 1949) for operating of said throttle lever 51.

Figure 2:
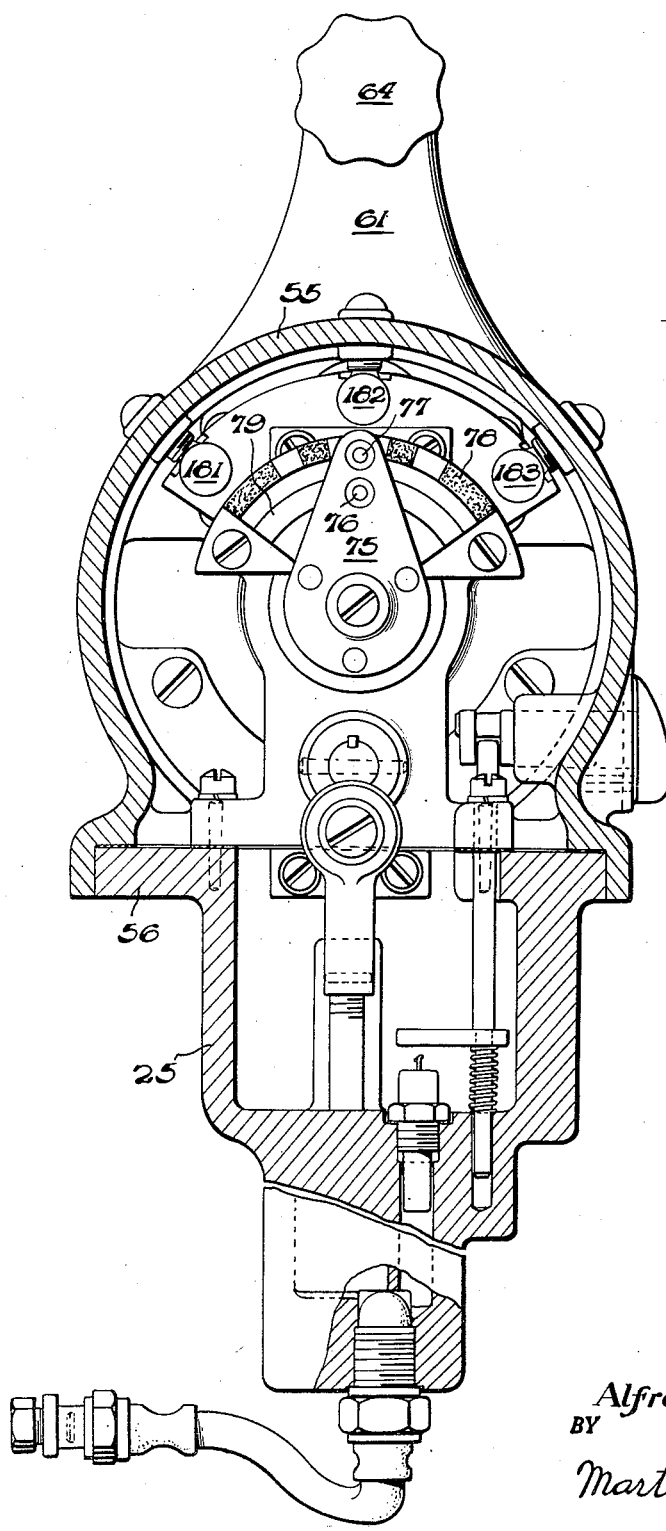
Figure 2 is a front view, with part of the housing removed.

The novel manual control means for units 10, 11, and 25 includes a generally cylindrical housing 55 (Figures 1 and 2) having an open lower region for registry with the upper flanged wall 56 of the hydraulic transmitter unit 25, and an open end for registry with the circular rim 57 of the lower portion of actuator member 58. The said actuator member 58 includes a central boss 59 recessed to receive shaft 60 of the novel actuating assembly for units 10, 11, and 25; it also includes a tubular extension 61 constituting a handle by which the member 58 may be rotated about the axis of shaft 60 (the said shaft rotating therewith). An auxiliary actuator is provided for operation of the novel verniering unit, to be described, the said auxiliary actuator being shown as a small cylindrical knob 64 having a shank 65 journaled in the tubular handle 61. A peripheral groove 66 receives the end portion of a set-screw 67 to hold said knob 64 against axial displacement.

The novel means for producing successive operation of the power plant controls 3 and 51 includes parts associated with and operated by the shaft 60 as the latter is rotated about its axis in response to the swinging of the handle 61. As shown best in Figure 1 such parts include a circuit selecting assembly some of whose parts are mounted directly upon the reduced end portion 71 of the shaft 60 while co-operating circuit controlling elements are mounted on a semi-cylindrical block 72 of insulating material. The said block 72 is disposed in a stationary position directly above a sleeve 73 which is interposed between the shaft end 71 and the said block 72; the said sleeve being of nonconducting material and having a flange 74 riveted to a plate 75 carrying brushes 76 and 77 adapted to make electrical contact with the arcuate conducting steps 78 and 79, respectively (see Figure 6) mounted on or embedded in the said block 72; the brush carrying element 75 being in turn secured by a screw 81 to the shaft end 71 for rotation therewith. From the arcuate strips 78 and 79 electrical connections extend to the windings 86, 87, and 88 (see Figure 6) controlling the operation of valves 91, 92 and 93, respectively, the latter controlling the application of hydraulic pressure to the cylinders 10 and 11, and hence the operation of the reverse gear lever 3 through the intervening connections 94, 95 and 96; the operation of this portion of the mechanism being the same as that described in my aforesaid co-pending application No. 644,287 filed January 30, 1946.

The novel means for translating rotation of the shaft 60 into reciprocating movement of the piston rods 18 and 19, and thus into operation of the power plant throttle 51, is shown as including a sleeve 101 having a key connection 102 to the shaft portion 71, the said sleeve 101 also having integrated therewith a gear 103 adapted to mesh with and thereby rotate a pinion shaft 104 journaled in bearing assemblies 105 and 106 and carrying at its opposite ends a pair of cranks 108 and 109 together with crank pins 110 and 111, the former being the actuating element for the piston rod 18 and the latter the actuating element for the piston rod 19. Each crank pin carries a ball bearing assembly to facilitate easy translation of the crank motion into a reciprocating movement of the respective piston rods, the latter having wrist pin or other suitable connection to the pistons 21, 22, respectively. From the pistons 21, 22 the hydraulic action is transmitted to the unit 34 to produce shifting of the throttle 51 by connections operating as fully described in my aforesaid co-pending application No. 632,681 filed December 4, 1945.

The novel auxiliary mechanism for producing a verniering action for more precise shifting of the pistons 21, 22 is shown as including a coaster clutch device comprising clutch elements 121, 122, and 123, (Figure 3) the first named being integral with a shaft 124 rotatably supported in a ball bearing assembly 125 carried by the clutch housing 126. The said clutch housing is in turn supported on the main cylindrical housing 55. Shaft 124 carries a pinion 131 (see Figures 3 and 5) adapted to mesh with a correspondingly shaped pinion 132 to transmit rotation of the knob 64 to the clutch shaft 124; the pinion 132 being carried on the end of a flexible shaft 133 whose opposite end 134 has a key connection 135 to a spline 136 provided in the central bore of the shank portion 65 of the manually operable knob 64; the shaft 133 being disposed with the hollow portion of the handle 61 as shown best in Figure 1.

As shown best in Figures 3 and 3a, the clutch elements 121 and 122 have correspondingly kidney-shaped depressions 121a and 122a with converging surfaces in their opposing faces. These depressions receive one or more coupling elements of suitable shape, the coupling element disclosed in Figure 3 being a steel ball 120 adapted to move into torque transmitting relationship to the clutch element 122 in response to rotation of the shaft 124, the driving relationship being in turn communicated to the clutch element 123 by reason of the axial pressure exerted upon the conical face of the latter by the engaging conical face of the former. A compression spring 141 is interposed between the flat faces of the two elements 122 and 123 to yieldingly resist the establishment of this driving relationship between the elements 123 and 121 when the direction of torque effort proceeds from the left hand portion of the mechanism, as shown in Figure 3, rather than being induced by the knob 64 operating through the connections on the right hand side of the assembly. The clutch element 123 has an extending portion in the nature of a shaft 151 rotatable within the ball bearing assembly 152 and terminating in a toothed portion 153 constituting a pinion adapted to mesh with a set of teeth 154 provided on the arcuate rim 155 (Figure 1) of a cradle element 156 which is centrally keyed as indicated at 157 to the shaft sleeve 101 heretofore described. Due to the high reduction ratio between gears 153 and 154, verniering action is thus imparted to the piston rods 18 and 19 through the clutch and gear connections 121, 122, 123, 153, 154, 156, 157, 103, and 104. On the other hand, the movements of the shaft 60 resulting from normal swinging of the main actuator member 61 produce no corresponding operation of the clutch element 121 or the flexible shaft 133 for the coaster clutch device prevents the transmission of reverse torque through said elements.

In order to provide the attendant with visible indication of the actual position of the reverse gear lever 3 at all times, the cradle element 156 carries 3 signal lamps 181, 182 and 183 (see Figures 1, 2 and 6) adapted to be energized from a suitable source 184 and having electrical connection with a set of contact pieces 186, 187, and 188, respectively. The said pieces are engagable by a sliding contact element 189 carried on an arm 190 attached to the piston rod 94 whose movement controls the shifting of the reverse gear lever 3. Thus one or another of the signal lamps—depending upon the position of the piston rod 94—will be illuminated to indicate whether the reverse gear is in the forward, reverse or neutral position at any given time. The cradle 156 carries the ground connections from these lamps and also carries bearing elements 201 and 202 to facilitate rotation of the cradle 156 with the shaft 60.

In the neutral or full upright position of the handle 61 (see Figure 1) one crank arm (109) is in the uppermost position and the other (108) in its downmost position, and the hydraulic pistons 22, 21 are correspondingly positioned. This position, through the medium of the shifter 51, corresponds to idling position of the engine throttle. Motion of the handle either to the left or right from the neutral position therefore tends to produce motion in the lever 51 to increase the throttle on the engine.

By virtue of the fact that practically no linear motion is produced in pistons (due to the crank arms riding over center for about fifteen degrees either side of the vertical or neutral) there is substantially no advance of throttle in this range and consequently this band is utilized for the operation of the engine reverse gear through the medium of the electrical contacts 76, 77 driven from the end of the shaft 60.

Therefore, the initial or first fifteen degrees' movement of the handle in either direction causes reverse gear engagement in either the ahead or reverse direction, and additional movement of the handle produces an increase in throttle setting. Conversely, motion of the handle toward the vertical position produces first a decreasing throttle and then a return of the reverse gear to neutral, by making the neutral position circuit.

Because of the angularity involved in the crank action, the throttle motion is increasingly progressive until the crank arm has moved ninety degrees from the initial position and then decreasingly progressive until maximum throttle is reached at the one hundred and fifty degree position, the crank arms having an over-all angular rotation of three hundred degrees. This produces close throttle regulation at low speed and at high or normal running speed, with fast throttle advance in the intermediate range. For even closer throttle control the knob 64 may be used, to produce the vernier drive above explained.

What is claimed is:

1. In a driving mechanism, a rotatable shaft, primary driving means including a handle swingable about said shaft as its center for rotating said shaft, auxiliary means located in said handle for rotating said shaft at a reduced ratio, said auxiliary means including a driving member, and a coaster clutch device interposed between said driving member and said rotatable shaft for driving the latter, said coaster clutch device constructed and arranged to normally disengage said driving member from driving engagement with said shaft and responsive to rotation of said driving member to thereby shift said clutch into torque transmitting relation to said shaft.

2. A control device comprising a shaft to be rotated, a handle fixedly connected to the shaft and swingable about the shaft axis for imparting rotation to the shaft, an arcuately formed gear rack carried by the shaft and having a radius with its center along the shaft axis, auxiliary means for imparting rotation to the shaft at a reduced ratio, said auxiliary means carried by the handle and interposed therebetween and the gear rack and including a pinion gear intermeshing with the gear rack, a clutch mechanism normally disengaged, and a member carried by the handle and movable relative thereto for causing engagement of the clutch mechanism when it is desired to drive the shaft through said auxiliary means.

ALFRED C. D'ARCEY.

REFERENCES CITED

The following references are of record in the file of this patent:

UNITED STATES PATENTS

| Number | Name | Date |
|---|---|---|
| 1,634,861 | Weyrnan | July 5, 1927 |
| 1,882,805 | Gillett | Oct. 18, 1932 |
| 1,994,651 | Kingston | Mar. 19, 1935 |
| 2,124,097 | Wolfram | July 19, 1938 |
| 2,294,974 | Freeman | Sept. 8, 1942 |
| 2,313,768 | Putt | Mar. 16, 1943 |
| 2,326,796 | Panish | Aug. 17, 1943 |